(12) United States Patent
Coleman et al.

(10) Patent No.: US 10,166,503 B2
(45) Date of Patent: Jan. 1, 2019

(54) WATER CONTROL IN NON-AQUEOUS ACID GAS RECOVERY SYSTEMS

(71) Applicant: Research Triangle Institute, Research Triangle Park, NC (US)

(72) Inventors: Luke Coleman, Durham, NC (US); Marty Lail, Raleigh, NC (US); Kelly E. Amato, Cary, NC (US); Jak Tanthana, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 15/118,722

(22) PCT Filed: Feb. 13, 2015

(86) PCT No.: PCT/US2015/015746
§ 371 (c)(1),
(2) Date: Aug. 12, 2016

(87) PCT Pub. No.: WO2015/123490
PCT Pub. Date: Aug. 20, 2015

(65) Prior Publication Data
US 2017/0050140 A1  Feb. 23, 2017

Related U.S. Application Data

(60) Provisional application No. 61/939,569, filed on Feb. 13, 2014.

(51) Int. Cl.
*B01D 53/14* (2006.01)
*B01D 53/26* (2006.01)

(52) U.S. Cl.
CPC ..... *B01D 53/1412* (2013.01); *B01D 53/1425* (2013.01); *B01D 53/1475* (2013.01);
(Continued)

(58) Field of Classification Search
CPC ............... B01D 53/40; B01D 53/1493; B01D 2252/202; B01D 2258/0283;
(Continued)

(56) References Cited

U.S. PATENT DOCUMENTS 4,112,051 A  9/1978 Sartori et al.
8,506,914 B2  8/2013 Bara
(Continued)

FOREIGN PATENT DOCUMENTS

DE  102008013738 A1  9/2009
EP     0671199 A2    9/1995
(Continued)

OTHER PUBLICATIONS

Kvamsdal, Hanne Marie; "Maintaining a neutral water balance in a 450 MWe NGCC-CCS power system with post-combustion carbon dioxide capture aimed at offshore operation"; International Journal of Greenhouse Gas Control vol. 4 pp. 613-622; <www.elsevier.com/locate/ijggc> May 20, 2009.
(Continued)

*Primary Examiner* — Amber R Orlando
*Assistant Examiner* — Syed T Iqbal (57) ABSTRACT

This invention is directed to methods and systems for controlling water in acid gas removal processes comprising the steps of a) treating the gas stream in an absorption zone with the NAS absorption liquid; b) direction the acid gas-loaded NAS absorption liquid to a regeneration zone; c) directing the regenerated NAS absorption liquid to step a); and d) controlling the first and second set of conditions.

17 Claims, 5 Drawing Sheets

(52) U.S. Cl.
CPC .... *B01D 53/1493* (2013.01); *B01D 2252/202* (2013.01); *B01D 2252/204* (2013.01); *B01D 2252/2026* (2013.01); *B01D 2252/2028* (2013.01); *B01D 2252/20405* (2013.01); *B01D 2252/20421* (2013.01); *B01D 2252/20426* (2013.01); *B01D 2252/30* (2013.01); *B01D 2252/40* (2013.01); *B01D 2258/0233* (2013.01); *B01D 2258/0283* (2013.01); *Y02C 10/06* (2013.01)

(58) Field of Classification Search
CPC ........ B01D 2257/308; B01D 2252/504; B01D 2257/302; B01D 2257/404; B01D 2257/504; B01D 2252/20421; B01D 2257/30; B01D 53/1425; B01D 53/1456; B01D 53/1475; B01D 2252/20405; B01D 2252/20426; Y02C 10/06
See application file for complete search history.

(56) References Cited

U.S. PATENT DOCUMENTS

| | | |
|---|---|---|
| 2004/0253159 A1 | 12/2004 | Hakka et al. |
| 2009/0136402 A1 | 5/2009 | Heldebrant et al. |
| 2009/0220397 A1 | 9/2009 | Heldebrant et al. |
| 2011/0229393 A1 | 9/2011 | Hu |
| 2012/0067059 A1 | 3/2012 | Katz et al. |
| 2012/0230896 A1 | 9/2012 | Wagner et al. |
| 2013/0052109 A1 | 2/2013 | Davis et al. |
| 2013/0164200 A1* | 6/2013 | Lail .................... B01D 53/1425 423/210 |
| 2013/0230440 A1 | 9/2013 | Katz et al. |

FOREIGN PATENT DOCUMENTS

| | | |
|---|---|---|
| FR | 1244414 A | 10/1960 |
| WO | 2009097317 A2 | 8/2009 |
| WO | 2012031274 A1 | 3/2012 |
| WO | 2012031281 A2 | 3/2012 |
| WO | 2012031281 A3 | 3/2012 |
| WO | 2012034921 A1 | 3/2012 |

OTHER PUBLICATIONS

Wang, Congmin; "Carbon Dioxide Capture by Superbase-Derived Protic Ionic Liquids"; Angrew. Chem. Int. Ed. 2010, 49, 5978-5981.
International Search Report from related International Application No. PCT/US2015/015746.
International Preliminary Report on Patentability from related International Application No. PCT/US2015/015746 dated May 26, 2015.
Chinese Office action dated Jun. 15, 2017 from related Chinese Application No. 201580008558.7.
Partial Supplementary European Search Report dated Aug. 28, 2017 from related European Application No. 15749470.9.
Extended European Search Report issued in counterpart EP Application No. 15749470.9 dated Dec. 1, 2017 (thirteen (13) pages).
Chinese-language Office Action issued in counterpart CN Application No. 201580008558.7 dated Apr. 11, 2018 (nine (9) pages).
Chinese Summary of Objections issued in counterpart CN Application No. 201580008558.7 (five (5) pages).

* cited by examiner

WATER CONTROL IN NON-AQUEOUS ACID GAS RECOVERY SYSTEMS

CROSS REFERENCE TO RELATED APPLICATIONS

This application is a § 371 U.S. National Stage of International Application PCT/US2015/015746, filed Feb. 13, 2015, which claims the benefit of 61/939,569 filed Feb. 13, 2014, Coleman et al., which are hereby incorporated by reference in their entireties.

STATEMENT REGARDING FEDERALLY SPONSORED RESEARCH OR DEVELOPMENT

This invention was made with government support under Grant No. DE-AR0000093 awarded by the U.S. Department of Energy. The government has certain rights in the invention.

1. FIELD OF THE INVENTION

This invention relates generally to the discovery of methods and systems for controlling water in acid gas (AG) removal processes.

2. BACKGROUND OF THE INVENTION

2.1. Introduction

Greenhouse gas and acid gas (AG) emissions ($CO_2$, $SO_x$, $NO_x$, $H_2S$, COS, $CS_2$) from power generation or other industrial processes are a huge problem globally. Many different approaches are being explored to recover such gases from combustion or other sources. The significant reduction of carbon dioxide ($CO_2$) emissions from existing and new, upcoming coal-fired power plants presents an enormous opportunity for mitigating greenhouse gas emissions and ultimately global climate change. In the United States, approximately 50% of the electrical power generation capacity comes from coal-fired power plants, which contribute to approximately 80% of $CO_2$ emissions from electrical power generation and roughly 36% of total $CO_2$ emissions. Annual Energy Outlook, DOE/EIA-0383. 2009. Therefore, development of technologies that cost-effectively reduce $CO_2$ emissions from coal-fired power plants is very important to retaining coal-fired power plants within a power generation portfolio especially if climate change regulations are enacted.

Currently, conventional $CO_2$ capture technologies, using aqueous systems such as alkyl amines, e.g., aqueous-monoethanolamine (MEA) based solvent systems, are prohibitively expensive and if implemented could result in a 75 to 100% increase in the cost of electricity (ICOE) for consumers. Existing Plants, Emissions and Capture—Setting $CO_2$ Program Goals, DOE/NETL-1366. 2009. Major contributors to the high ICOE with the conventional capture technologies is the high parasitic power load associated with releasing $CO_2$ from the solvent during solvent regeneration and the high capital costs associated with the scale and materials of construction of the process equipment.

1.1. Water Balancing in Non-Aqueous Solvent (NAS) Acid Gas Removal Systems

Work in non-aqueous solvent (NAS) acid gas (AG) recovery methods include publications from Heldebrandt et al., U.S. Pat. Pub. Nos. US 2009/0136402, US 2009/0220397 and PCT Intl. Pub. No. WO 2009/097317 which disclose reversible AG binding organic liquid systems. These systems permit separation and capture of one or more of several acid gases from a mixed gas stream, transport of the liquid, release of the AGs from the ionic liquid, and reuse of the liquid. They disclose various AG Binding Organic Liquids (BOLs), e.g., $NO_2$BOLs, $SO_2$BOLs, or $CO_2$BOLs.

Wang et al. disclose $CO_2$ capture reagents with superbase-derived protic ionic liquids (PILs). Wang et al. 2010 *Angew Chem Int Ed* 49 5978-5981. They disclose acid gas absorbing PILs which comprise a superbase and weak proton donors (fluorinated alcohols, imidazoles, pyrrolidinones, phenols) to form liquid carbonates, carbamates, or phenolic salts on reaction with $CO_2$.

Lail et al., PCT Intl. Pub. No. WO 2012/031274 discloses AG removal solvent systems with ionic liquids formed with acid components (fluorinated alcohols) and nitrogenous bases (amines, amidines or guanidines).

Lail et al., PCT Intl. Pub. No. WO 2012/031281 discloses AG removal solvent systems with a diluent and nitrogenous bases (amines, amidines or guanidines).

Bara, U.S. Pat. No. 8,506,914 B2 discloses a $CO_2$ removing solvent comprising of an N-functionalized imidazole and an amine.

Davis and Perry, US 2013/0052109 A1 discloses a $CO_2$ absorbent composition containing a liquid, non-aqueous, silicon-based material, functionalized with one or more groups that reversibly react with $CO_2$ and/or have a high-affinity for $CO_2$; and at least one amino alcohol compound.

In general, water balancing in $CO_2$ capture processes and AG scrubbing processes is maintaining the desired water content of the solvent by controlling the rates of water accumulation and evaporation to avoid both (i) diluting the solvent and flooding the process or (ii) concentrating the solvent and starving the process of water. Water balancing in AG removal processes is also desirable because many processes are an open systems and water is typically introduced to the system via the feed gas and leaves the system via numerous pathways specific to the process typically including the treated gas, the AG product stream, and aqueous contaminant purging streams. At some times it is preferable to operate the process in a manner that maintains the overall water content at or near optimal concentrations. Numerous approaches to maintaining a water balance in aqueous amine-based $CO_2$ capture processes have been developed and industrially implemented for over 60 years.

Water is introduced to the AG process via the feed gas stream and specifically for $CO_2$ removal processes via the flue gas stream. Water can exit the system via numerous streams including the treated gas, the regenerator off-gas, or as a purged liquid water stream. The flue gas stream from a typical 550 MWe supercritical pulverized coal (SCPC) boiler power plant equipped with a wet flue gas desulfurization (wFGD) unit will contain approximately 502,000 lb/h of water as it is saturated at ~56.7° C. (~16.7 vol %) [DOE-NETL-2010/1397]. For many $CO_2$ removal processes, it is envisioned that this flue gas stream will be further desulfurized to <10 ppm via a deep sulfur scrubber using NaOH. Deep $SO_2$ scrubbing is described as working optimally at ~40° C. and therefore the flue gas temperature and water content will be concomitantly reduced. Reducing the temperature of the flue gas stream to 40° C. lowers the water content to 7.38% and thus the amount of water entering the $CO_2$ absorber in the flue gas stream is reduced from ~502,000 lb/h to 222,000 lb/h. In order for water accumulation in the solvent/process not to be an issue, it must either be condensed or adsorbed/absorbed by the solvent.

For the AG removal process to have a neutral water balance, the same amount of water must leave the process as enters on a time-averaged basis. Water balancing is a necessary consideration for all AG scrubbing processes including $CO_2$ removal processes and processes that utilize aqueous- and non-aqueous-based solvents. Numerous methods/approaches to addressing this operational issue have been developed and employed for decades. The most commonly practiced approaches to controlling water content in AG removal processes have been described by Kvamsdal et al. 2010 *Int J Greenhouse Gas Contr* 4 613-620, and typically include: (i) flue gas temperature, absorber inlet and outlet; (ii) temperature profile within the absorption section of the absorber; (iii) absorber inlet lean amine temperature specification; and (iv) washing sections in the top of the absorber and desorber. In order to balance the water in $CO_2$ removal processes, Kvamsdal et al. suggests the following: (i) precooling the flue gas prior to the absorption column; (ii) water recycling; and (iii) gas cooling on leaving the absorption column.

In a non-aqueous solvent (NAS)-based AG removal process, water can also be introduced to the system via the feed gas stream, e.g., a combustion flue gas. However, maintaining a water balance in a NAS process can be complicated due to the non-aqueous, i.e., non-water based, nature of the AG selective solvent. Water in the feed gas can be condensed by contact with a colder NAS stream, e.g., in the absorber, and if water has a measureable solubility in the NAS than it can be adsorbed or stripped by the NAS. As such, water can be present in the NAS process as water soluble in the NAS and as a separate water-rich phase with the distribution depending upon the solubility of water in the NAS. Due to the low water miscibility of NASs, the prospect of forming a separate, water-rich phase in a NAS AG removal process is high. The formation of a bi-phasic NAS-rich/water-rich mixture in a NAS AG removal process represents significant processing and operating challenges.

Recently, Katz et al., U.S. Pat. Pub. No. US 2013/0230440 discloses a theoretical mechanical process for removing AGs from water containing streams such combustion exhaust gases and water separation/recovery. Initially water in the fluid stream is either condensed or dissolved in the acid gas absorption liquid and is accumulated as a separate aqueous phase. The accumulation of water in NAS creates a bi-phasic system consisting of a water-rich and a non-aqueous-rich phase and the water-rich phase would be separated from the non-aqueous solvent-rich phase via mechanical separation to sustain the process operability and stability. The condensed water or aqueous phase is removed by decanting and/or centrifuging. The removed water is then brought in contact with the treated gas stream to rehydrate the treated gas.

Several shortcomings of Katz et al., U.S. Pat. Pub. No. US 2013/0230440 are apparent. First, this approach requires the formation of a bi-phasic solvent that can be separated via mechanical separation. Second, due to the scale of the process, the size of the liquid decanter will be very large and will greatly increase the capital expense of the process. Third, the process operation will become more complicated due to the additional complexity of an added decanter system. Fourth, achieving a neutral water balance by rehydrating the treated gas in a rehydration zone will require the addition of heat increasing the energy demand for the process.

2. SUMMARY OF THE INVENTION

To maintain a water balance in a NAS AG removal process, water must leave the process via three routes: 1) the treated feed gas stream, 2) the regenerator off-gas, and/or 3) a liquid water purge at the same time-averaged rate as it enters in the feed gas. These options are considered below:

Option 3: Purging the water-rich phase is not a desired route as this water-rich stream will be saturated with the NAS which can amount to a few wt % [Lail et al., PCT Intl. Pub. No. WO 2012/031274; Lail et al., PCT Intl. Pub. No. WO 2012/031281]. The purged water-rich stream would therefore need to be treated to recover the NAS to control NAS make-up costs and to avoid releasing hazardous chemicals to the environment. This represents a significant processing challenge and an operational cost.

Option 2: Removing water from the process via the regenerator off-gas requires that the water in the process be vaporized in the solvent regenerator (desorber) and then to be recovered from the off-gas by condensation. The condensate can be fully refluxed to the column, partially refluxed, or not refluxed at all. In the latter two cases, a purified water stream almost free of the solvent can be recovered and removed from the process. This option requires significant energy input since the water must be vaporized to be separated from the NAS.

Option 1: Operating the NAS AG removal process in a manner that the water entering the absorber in the feed gas stream leaves the absorber via the treated flue gas stream. In this approach minimal, if any, energy input is required and a liquid water-rich stream containing the NAS can be avoided. This can be achieved via numerous methods including control of the feed gas conditions, the lean NAS feed conditions, exploitation of the absorber temperature profile, and NAS formulation.

In particular non-limiting embodiments, the present invention provides a process for regulating water content and removing acid gases from a water-containing gas stream using a non-aqueous solvent (NAS) absorption liquid which comprises: (a) treating the gas stream in an absorption zone with the NAS absorption liquid under a first set of controlled conditions of temperature, pressure and flow rate to obtain an acid gas-depleted treated gas stream and an acid gas-loaded NAS absorption liquid; (b) directing the acid gas-loaded NAS absorption liquid to a regeneration zone under a second set of controlled conditions of temperature, pressure and flow rate and regenerating the loaded NAS absorption liquid to expel a portion of the acid gases and obtain a regenerated NAS absorption liquid; (c) directing the regenerated NAS absorption liquid to step a); and (d) controlling the first and second set of conditions so as to avoid the necessity of a separation device to separate a water-rich phase from the NAS absorption liquid, to regulate the water content, and remove acid gases from the water-rich gas stream.

An acid gas recovery system using an NAS absorption liquid which comprises: (a) an absorption unit for treating a water-rich gas stream with an absorption zone containing the NAS absorption liquid under a first set of controlled conditions of temperature, pressure and flow rate which forms an acid gas-depleted treated gas stream and an acid gas-loaded NAS absorption liquid; (b) a regeneration unit with a regeneration zone in fluid communication with the acid gas-loaded NAS absorption liquid under a second set of controlled conditions of temperature, pressure and flow rate and regenerating the loaded NAS absorption liquid to expel a portion of the acid gases and to form a regenerated NAS absorption liquid; (c) a means to return the regenerated NAS absorption liquid to the absorption unit in step (a); and (d) a controller for the first and second set of conditions so to avoid the necessity of a separation device to separate a water-rich phase from the NAS absorption liquid, to regulate the water content, and remove acid gases from the water-rich gas stream.

In the process and system above, the water content may be regulated such that the quantity of water entering the process in the water-rich gas stream balances the water content leaving the process in the acid gas-depleted treated gas stream or off gases from the regeneration zone. Alternatively, the water content may be regulated such that the quantity of water entering the process in the water-rich gas stream is greater than the water content leaving the process in the acid gas-depleted treated gas stream or off gases from the regeneration zone, and water is accumulated in the process. Depending on process needs, the water content may be regulated such that the quantity of water entering the process in the water-rich gas stream is less than the water content leaving the process in the acid gas-depleted treated gas stream or off gases from the regeneration zone and water is depleted in the process.

A process for regulating water content and removing acid gases from a water-containing gas stream using an NAS absorption liquid which comprises: (a) treating the gas stream in an absorption zone with the NAS absorption liquid under a first set of controlled conditions of temperature, pressure and flow rate to obtain an acid gas-depleted treated gas stream and an acid gas-loaded NAS absorption liquid; (b) directing the acid gas-loaded NAS absorption liquid to a regeneration zone under a second set of controlled conditions of temperature, pressure and flow rate and regenerating the loaded NAS absorption liquid to expel a portion of the acid gases and obtain a regenerated NAS absorption liquid; (c) directing the regenerated NAS absorption liquid to step a); and (d) controlling the first and second set of conditions so as to (i) balance the water content entering the process in the water-rich gas stream with the water content leaving the process; (ii) accumulate water from the water-rich gas stream; or (iii) deplete water from water-rich gas stream; and remove acid gases from the water-rich gas stream.

In particular embodiments of the processes or systems above, the acid gas may be carbon dioxide. The water-containing gas stream may come from a desulfurization pre-treatment process. The gas stream may be a flue gas from the combustion of a fossil fuel, an exhaust gas from a combustion process, or an exhaust gas from a cement plant.

In the processes or systems above, regenerating the loaded NAS absorption liquid may occur by pressure release, heating, stripping or a combination thereof. In one embodiment, the loaded NAS absorption liquid is preheated by indirect heat exchange with the regenerated absorption liquid.

In the processes or systems above, the NAS absorption liquid may comprise a nitrogenous base and a weak acid. Alternatively, the NAS absorption liquid may comprise a nitrogenous base having a nitrogen with a hydrogen atom leaving group and a diluent. The nitrogenous base may be an amine, an amidine, a guanidine, or a combination thereof, e.g., 2-fluorophenylethylamine or N-methylbenzylamine. The weak acid may be a fluorinated alcohol, e.g., octafluoropentanol, or other fluorinated alcohols with weak acid functionality; or phenols or substituted phenols with weak acid functionality. The diluent may be an aliphatic diluent, a hydrophobic diluent, or a polyether diluent. The polyether diluent may be a substituted ether of polyethylene glycol, a substituted ether of polypropylene glycol, or a mixture thereof.

In one embodiment, the solvent system may be immiscible with water. In another non-limiting embodiment, the solvent system has a solubility with water of less than about 10 g of water per 100 g of NAS.

4. DETAILED DESCRIPTION OF THE INVENTION

The invention describes a method for achieving water balancing in a non-aqueous solvent (NAS) AG removal process and more specifically a $CO_2$ removal process, avoiding the formation of a water-rich phase that must be mechanically separated from the NAS. In some embodiments, it is preferable to operate the absorber such that the mass of water entering the column in the feed gas stream leaves in the treated gas stream. One approach is to control the feed gas temperature and thus the water content of the feed gas stream while simultaneously controlling the temperature of the treated gas exiting the top of column. Several factors contribute to the temperature of the treated gas exiting the column including the lean solvent feed temperature but more importantly the temperature profile in the absorber. The specific shape of the temperature profile in the absorber is dependent upon the heat of absorption, the gas and liquid heat and mass transfer characteristics, and gas and liquid flow rates.

Due to the exothermic nature of the AG absorption reaction and the counter-current flow of gas and liquid, the temperature profile of the absorber exhibits a maximum or bulge at some intermediary point in the column and as such, the liquid typically leaves the bottom of the column at a temperature greater than the flue gas enters and the treated flue gas typically leaves the top of the column at a temperature greater than the feed solvent. As such, controlling the temperature of the treated gas stream can be used to balance the water in the process, however, since there are many contributing factors to the temperature of the outlet gas stream and there is no single control variable to adjust. One approach to controlling the treated gas temperature exiting the top of the column is to control the temperature of the solvent feed to the absorber. Although not a direct control variable, in most cases it can be used as a good surrogate variable. For the treated gas to carry the same mass of water it must leave the absorber slightly warmer than the flue gas enters the column since both gases are nearly saturated with water and the flow rate of the treated gas exiting the absorber is lower than the feed gas due to the absorption of some fraction of the $CO_2$ portion of the feed gas stream. For coal-derived flue gas applications, the flow rate of the treated gas is approximately 88% of the feed gas assuming a $CO_2$ concentration of 13.3% and a capture efficiency of 90%. As such the treated gas must be slightly warmer than the feed gas.

Based on several sets of experiments including three phase ($CO_2$—$H_2O$-NAS) equilibrium measurements and continuous testing in a lab-scale absorption-regeneration system representing the process, it has been shown that a neutral water balance can be achieved in a NAS $CO_2$ removal process by: (i) avoiding the formation of a second water phase through adjusting the operating conditions of the absorber and therefore eliminating the need for separation devices and (ii) eliminating the separation device and feeding a biphasic solvent directly to the $CO_2$ absorber.

Both of these water balancing methods are not described in the prior art and are considered improvements. The proposed water balancing methods: (i) simplify the process design and operation by eliminating separation equipment; (ii) reduce the capital cost of the AG removal process; (iii) create a neutral water balance via ensuring that the treated gas stream contains the same mass of water as the feed gas entering the absorber; (iv) beneficially integrates the water balancing and AG absorption in the same process vessel; and (v) effectively provides the heat required for evaporating water into the gas stream by utilizing the exothermic heat of absorption while simultaneously providing in-situ cooling to the NAS during the absorption process.

In addition, this approach to water balancing is applicable to process operating strategies that lead to the NAS being described as water containing yet forms a single phase and the case where the water content is higher such that there are two phases, a water-rich phase and an NAS-rich phase. In the case that two phases are formed, the water-rich stream can be separated from the NAS and introduced to the absorber top and additionally, in the cases where the solvent is either water containing or a two-phase mixture, the solvent will be returned directly to the top of the absorber without using a water separation device.

4.1. Definitions

As used herein the term "non-aqueous solvent" (NAS) means an organic solvent system that is miscible (NAS) means an organic solvent system that is miscible with 0-20% (weight/weight percent water), 0-10% (weight/weight percent) water, and preferably less than 10 (weight/weight percent) water. NAS includes both polar aprotic and protic solvent systems and mixtures thereof. The NAS may be weak acids or nitrogenous bases. The NAS may be a 3-way combination of a weak acid, a nitrogenous base, and a polyether diluent.

4.2. NAS Systems

In some specific embodiments, the weak acid may be selected from the group consisting of: 2,2,3,3,4,4,5,5-octafluoropentanol ("OFP"); 2,2,3,3 tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7 nonafluoroheptanol; 1,1,3,3-hexafluoro-2-phenyl-2-propanol 4-methoxyphenol ("4-MeOPh"); 4-ethoxyphenol ("4-EtOPh"); 2-ethoxyphenol; 4-propoxyphenol; imidazole; benzimidazole; N-methylimidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole; or mixtures thereof. In some embodiments, the weak acid has a pKa of 8-15.

In some embodiments, the nitrogenous base may be a primary or secondary amine, an amidine, or a guanidine. In certain embodiments, the primary or secondary amine may be selected from amines functionalized with fluorine-containing-alkyl-aromatic groups. In specific embodiments, the amine may be selected from the group consisting of 2-fluorophenethylamine; 3-fluorophenethylamine; 4-fluorophenethylamine; 2-fluoro-N-methylbenzylamine; 3-fluoro-N-methylbenzylamine; 4-fluoro-N-methylbenzylamine; 3,5-difluorobenzylamine; D-4-fluoro-alpha-methylbenzylamine; L-4-fluoro-alpha-methylbenzylamine; or mixtures thereof.

In certain embodiments, the nitrogenous base may be selected from the group consisting of 1,4-diazabicycloundec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; monoethanolamine ("MBA"); diethyl amine ("DEA"); ethylenediamine ("FDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethyl amine; 3,5-difluorobenzylamine; 3-fluoro-N-methylbenzylamine; 4-fluoro-N-methylbenzylamine; imidazole; benzimidazole; N-methyl benzylamine; N-methyl imidazole; 1-trifluoroacetylimidazole; 1,2,3-triazole; 1,2,4-triazole; or mixtures thereof. In other embodiments, the nitrogenous base may be a guanidine or an amidine.

Examples of NAS systems may be found in Wang et al. 2010 *Angew Chem Int Ed* 49 5978-5981; U.S. Pat. Pub. Nos. US 2009/0136402, or US 2009/0220397; and PCT Intl. Pub. Nos. WO 2009/097317, WO 2012/031274, or WO 2012/031281, the contents of which are hereby incorporated by reference in their entireties.

Unless defined otherwise, all technical and scientific terms used herein have the same meaning as commonly understood by one of ordinary skill in the art to which this invention belongs. The article "a" and "an" are used herein to refer to one or more than one (i.e., to at least one) of the grammatical object(s) of the article. By way of example, "an element" means one or more elements.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The following Examples further illustrate the invention and are not intended to limit the scope of the invention. In particular, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

5. EXAMPLES

5.1. Example 1

Three Phase Equilibrium Measurements to Observe Water Separation in a NAS $CO_2$ Removal System A 5 mL sample of an exemplary NAS consisting of equimolar portions of 2-fluorophenethylamine (2FPEA) and octafluoropentanol (OFP) and a 5 mL aliquot of DI water were placed in a stirred glass, round bottom flask equipped with an overhead condenser. Excess water was maintained in the vessel at all times to ensure that equilibrium $H_2O$ loading in the NAS was achieved. The pressure of the stirred vessel was maintained at atmospheric pressure. The two phase sample was heated to the desired temperature, i.e., 40, 80, or 90° C., using a electric heater jacket and 100 mL/min of a $CO_2$—$N_2$ blend gas with various compositions was bubbled through the two phase liquid sample. The $CO_2$—$N_2$ feed was stopped once the $CO_2$ concentration in the outlet stream was >99% of the inlet concentration. A 0.9 mL sample from the NAS phase was extracted from the batch vessel using a syringe through a septum and placed in a sealed 2.5 mL autosample vial. 0.1 mL of methanol was added to the sealed vial and analyzed for $CO_2$, $H_2O$, and NAS mass composition using an in-house developed gas chromatographic method. Each reported measurement is an average of three replicate injections. A short description (rationale) for the experimental conditions (i.e., temperature, $CO_2$ concentration in feed) used to prepared each sample is provided in Table 1. Each sample was prepared in a manner that approximates the process conditions at the top and bottom of the absorber and desorber in a conventional AG scrubbing/removal process arrangement.

TABLE 1

| Sample ID | Temp. [° C.] | $CO_2$ Conc. [% vol] | Rationale |
|---|---|---|---|
| 1 | 40 | 13 | Absorber Inlet; $CO_2$-rich solvent |
| 2 | 30 (40) | 13 | Absorber Inlet; $CO_2$-rich solvent; Cooled to 30° C. to determine if cooling shifts the $H_2O$ equilibrium |
| 3 | 40 | 1.0 | Absorber Inlet; Approx. conditions that the $CO_2$-lean solvent will see upon entering the Absorber; Attempt #1 for matching $CO_2$ comp. of sample regen. at 80° C. |
| 4 | 40 | 0.5 | Absorber Inlet; Approx. conditions that the $CO_2$-lean solvent will see upon entering the Absorber; Attempt #2 for matching $CO_2$ comp. of sample regen. at 80° C. |
| 5 | 40 | 0.1 | Absorber Inlet; Approx. conditions that the $CO_2$-lean solvent will see upon entering the Absorber; Attempt #3 for matching $CO_2$ comp. of sample regen. at 80° C. |

TABLE 1-continued

| Sample ID | Temp. [° C.] | $CO_2$ Conc. [% vol] | Rationale |
|---|---|---|---|
| 6 | 80 | 100 | Desorber Inlet; Approx. conditions for the $CO_2$-rich solvent at 80° C. entering Regenerator |
| 7 | 80 | 13 | Desorber Outlet; Approx. conditions for the $CO_2$-rich solvent at 80° C. entering Regenerator |
| 8 | 40 (80) | 13 | Absorber Inlet; $CO_2$-lean solvent regenerated at 80° C.; Cooled to 40° C. to determine if cooling shifts the $H_2O$ equilibrium |
| 9 | 90 | 100 | Desorber Inlet; Approx. conditions for the $CO_2$-rich solvent at 90° C. entering Regenerator; |
| 10 | 40 (90) | 100 | Absorber Inlet; $CO_2$-lean solvent regenerated at 90° C.; Cooled to 40° C. to determine if cooling shifts the $H_2O$ equilibrium |

The Table 2 reports the equilibrium composition for the samples prepared at the conditions reported in Table 1. A total of 10 samples were prepared.

TABLE 2

| | | $CO_2$ | Compositional Analysis | |
|---|---|---|---|---|
| Sample ID | Temp. [° C.] | Conc. [% vol] | $CO_2$ [% wt] | $H_2O$ [% wt] |
| 1 | 40 | 13 | 2.66 | 8.70 |
| 2 | 30 (40) | 13 | 2.69 | 8.82 |
| 3 | 40 | 1.0 | 1.63 | 7.02 |
| 4 | 40 | 0.5 | 1.08 | 5.50 |
| 5 | 40 | 0.1 | 0.43 | 4.67 |
| 6 | 80 | 100 | 1.79 | 10.15 |
| 7 | 80 | 13 | 0.56 | 6.06 |
| 8 | 40 (80) | 13 | 0.57 | 4.45 |
| 9 | 90 | 100 | 0.81 | 7.47 |
| 10 | 40 (90) | 100 | 0.85 | 5.22 |

Samples approximating the $CO_2$-lean NAS entering the top of the $CO_2$ absorber (Sample 3-5), were found to have a $CO_2$ content ranging from 0.43 to 1.63% wt $CO_2$ and water contents of 4.67 to 7.02% wt $H_2O$ indicating that water content is a strong function of $CO_2$ content at 40° C., especially at low $CO_2$ contents in the NAS. These results indicate that the leaner the NAS returns from the desorber, the less likely a separate aqueous phase will form in the $CO_2$ absorber. A sample approximating the $CO_2$-rich NAS exiting the bottom of the absorber (Sample 1) was found to have a $CO_2$ content of 2.66% wt $CO_2$ and a water content of ~8.70% wt $H_2O$. Comparing the water content of the $CO_2$-rich sample (1) to that of the $CO_2$-lean samples (3-5), it is seen that the water content does not increase linearly with $CO_2$ content and, in fact, that water content increases most significantly at lower $CO_2$ contents. As stated above, the $CO_2$ content of the $CO_2$-lean NAS returning from the desorber can significantly affect the appearance of a second water phase in the absorber. Considering that the flue gas from a typical 500 MWe power plant carries with it ~500,000 lbs/hr of water, the $CO_2$-rich NAS at the bottom of the absorber would not be saturated with water for NASs returning to the absorber with a water content <~6.5 to 7.0 wt % $H_2O$.

A 4 mL aliquot of the NAS phase form the $CO_2$-rich sample (Sample 1) was extracted from the batch vessel and placed in a 5 mL sealed vial and cooled from 40° C. to 30°

C. in a temperature controlled oven to determine if cooling the $CO_2$ and $H_2O$-rich solvent could shift the $H_2O$ equilibrium thus creating a second water-rich phase (Sample 2). Although the compositional analysis indicates a small increase in the $CO_2$ and $H_2O$ content with decreasing temperature, comparing sample 1 and 2, this is not physically possible because no additional $CO_2$ or water were added to the 5 mL vial. The small difference in the CO2 and H2O contents is within the tolerance of the analytical method. A second liquid phase, a water-rich phase, was visually observed as a small globule floating on top of the NAS phase indicating that cooling the $CO_2$-rich NAS from 40° C. to 30° C. reduced the water content of the NAS phase but only by a very small amount.

A sample approximating the hot NAS entering the desorber (Sample 6) was prepared at 80° C. and 100% $CO_2$ (1 atm $CO_2$). These conditions represent the condition of the NAS exiting the desorber. At 80° C. and 1 atm $CO_2$, the $CO_2$ content of the NAS was found to be 1.79 wt % $CO_2$ which closely matches the $CO_2$ content of the sample prepared at 40° C. and 1% $CO_2$ (0.01 atm) (Sample 3). This suggests that under these absorber and desorber conditions, the process could operate continuously and in a balanced manner, at least with respect to $CO_2$, and achieve 90% $CO_2$ capture and generate a 1 atm $CO_2$ product stream. The water content of the 80° C. sample (Sample 6) was found to be 10.15 wt % $H_2O$. Comparing the water content of Sample 6 (80° C.) and 3 (40° C.), which have comparable $CO_2$ content, suggests that water content of the NAS is strongly dependent upon temperature. In fact, the regenerated solvent has a higher water content at 80° C. than the $CO_2$-rich NAS exiting the absorber (Sample 1). Therefore, under this desorber condition (80° C. & 1 atm), it is highly unlikely that water will separate from the NAS in the desorber.

A sample was prepared at 80° C. and 0.13 atm $CO_2$ (Sample 7) to achieve a $CO_2$ content in the $CO_2$— lean NAS. The $CO_2$ content decreased from 1.79 to 0.56% wt $CO_2$, a three-fold decrease, while the water content decreased from 10.15 to 6.06% wt $H_2O$ indicating a strong dependence of the water content in the NAS phase upon the $CO_2$ content of the NAS phase. Under these desorber conditions, water would form a separate and distinct phase in the desorber given adequate settling time. Although the $CO_2$ partial pressure appears to be low at first glance, it is a possible condition, although not preferred in this process arrangement, in the desorber if water in the NAS is evaporated effectively becoming a stripping agent and lowering the $CO_2$ partial pressure. Although there may be benefit from this in terms of broadening the $CO_2$ working capacity of the NAS, it comes at the cost of an increase energy penalty due to the energy required to vaporize the water and as such this is not a desired operating condition.

A 4 mL aliquot of the NAS phase from Sample 7 was extracted, using a similar method as described above, and cooled in a temperature controlled oven to 40° C. in a closed, sealed vial (Sample 8). Upon cooling, a second liquid phase, a water-rich phase, was formed which was clearly visible. The water content of the NAS phase decreased from 6.06 (Sample 7) to 4.45% wt (Sample 8) and the $CO_2$ and water content of the cooled sample closely matched that of Sample 5 indicating that the cooled sample achieved an expected equilibrium value although it was prepared in a different manner.

A sample approximating the hot NAS entering the desorber (Sample 9) was prepared at 90° C. under 100% $CO_2$ (1 atm $CO_2$). At 90° C. and 1 atm $CO_2$, the $CO_2$ content of the NAS was found to be 0.81 wt % $CO_2$ which closely matches the $CO_2$ content of the sample (Sample 4) prepared at 40° C. and 0.05% $CO_2$ (0.005 atm). This suggests that under these absorber and desorber conditions, the process could operate continuously and in a balanced manner, at least with respect to $CO_2$, and achieve 90% $CO_2$ capture and generate a 1 atm $CO_2$ product stream. The water content of the 90° C. sample (Sample 9) was found to be 7.47 wt %. Comparing the water content of Sample 9 (90° C.) and 4 (40° C.), which have comparable $CO_2$ content, once again suggests that the water content of the NAS phase is strongly dependent upon temperature. In fact, the regenerated NAS has nearly the same water content at 90° C. as the $CO_2$-rich NAS exiting the absorber (Sample 1).

A 4 mL aliquot of the NAS phase from Sample 9 was extracted, using a similar method as described above, and cooled in a temperature controlled oven to 40° C. in a closed, sealed vial (Sample 10). Upon cooling, a second liquid phase, a water-rich phase, was formed that was clearly visible. Compositional analysis of NAS phase revealed that the water content decrease from 7.47 (Sample 9) to 5.22% wt (Sample 10) and that the $CO_2$ and water content of the cooled sample closely matched that of Sample 4 indicating that the cooled sample achieved an expected equilibrium value although it was prepared in a different manner.

Example 1 clear shows that forming a separate water-rich phase in the absorber is highly unlikely and is only possible if the $CO_2$-lean NAS returning from the desorber is very rich in $CO_2$ and thus contains a high water content. As long as the $CO_2$-lean NAS returns to the absorber having a water content <6.5-7.0 wt %, the NAS will not become saturated with water from the feed flue gas and only one phase will be present in the Absorber. In addition, the process can be operated in a manner such that water does not separate from the NAS in the desorber or desorber sump, which is undesirable from an energetics perspective in that water vaporization is energy intensive. And finally, based on this set of experiments, the most likely location in the NAS $CO_2$ removal process for water to separate from the NAS and form a separate water-rich phase is upon cooling of the regenerated solvent prior to returning the $CO_2$-lean NAS to the $CO_2$ absorber feed.

Further, Example 1 teaches the following:
- the water content of the NAS is affected by temperature, $CO_2$ partial pressure, the $CO_2$ content of the NAS, and the NAS formulation
- the water content of the NAS can be manipulated/controlled by controlling process parameters including the temperature of the NAS, $CO_2$ partial pressure, the $CO_2$ content of the NAS, and the NAS formulation
- the formation of a separate, water-rich phase in the presence of a NAS can be controlled by process parameters including temperature, $CO_2$ partial pressure, the $CO_2$ content of the NAS, and the NAS formulation
- through proper operation of the process, it is unlikely that the $CO_2$-rich NAS exiting the absorber will be saturated with water or that a water-rich phase will be formed in the $CO_2$ absorber
- for this specific NAS formulation, there is insufficient water in a typical flue gas stream to saturate the $CO_2$-rich solvent exiting the absorber or to form a second, water-rich phase in the absorber
- the formation of a separate water-rich phase in the desorber is controllable and most importantly can be avoided through proper control of the process conditions a NAS process can be operated in a manner that a separate water-rich phase can be avoided in the main process vessels including absorber and desorber

5.2. Example 2

Water Balance in a NAS $CO_2$ Removal Process

An experiment was performed in a lab-scale, continuous flow gas absorption system having a standard absorber-desorber configuration to experimentally demonstrate control of the water balance in a NAS $CO_2$ removal process. A simplified schematic of the LsGAS is provided in FIG. 1 and the operating conditions are provided in Table 3. An exemplary NAS consisting of equimolar portions of 2-fluorophenethylamine (2FPEA) and octafluoropentanol (OFP) was used in this study. Selected process measurements from this experiment are presented in FIG. 2. Under these conditions the system was found to be very stable over the entire 100 h experiment exhibiting a $CO_2$ capture efficiency of ~85% and a $CO_2$ balance of ~102%±2%.

TABLE 3

| Feed Gas | |
|---|---|
| Flow Rate | 3 SLPM |
| Composition | 13.3% $CO_2$, 5.65% $H_2O$ (sat @ 35° C.), Bal. $N_2$ |
| Temperature | 40° C. |
| Absorber | |
| Flow Rate | 23 g/min |
| Inlet Temp. | 40° C. |
| Pressure | 1 atm |
| Desorber | |
| Temp. | 90° C. |
| Pressure | 1 atm |

Figure 2:
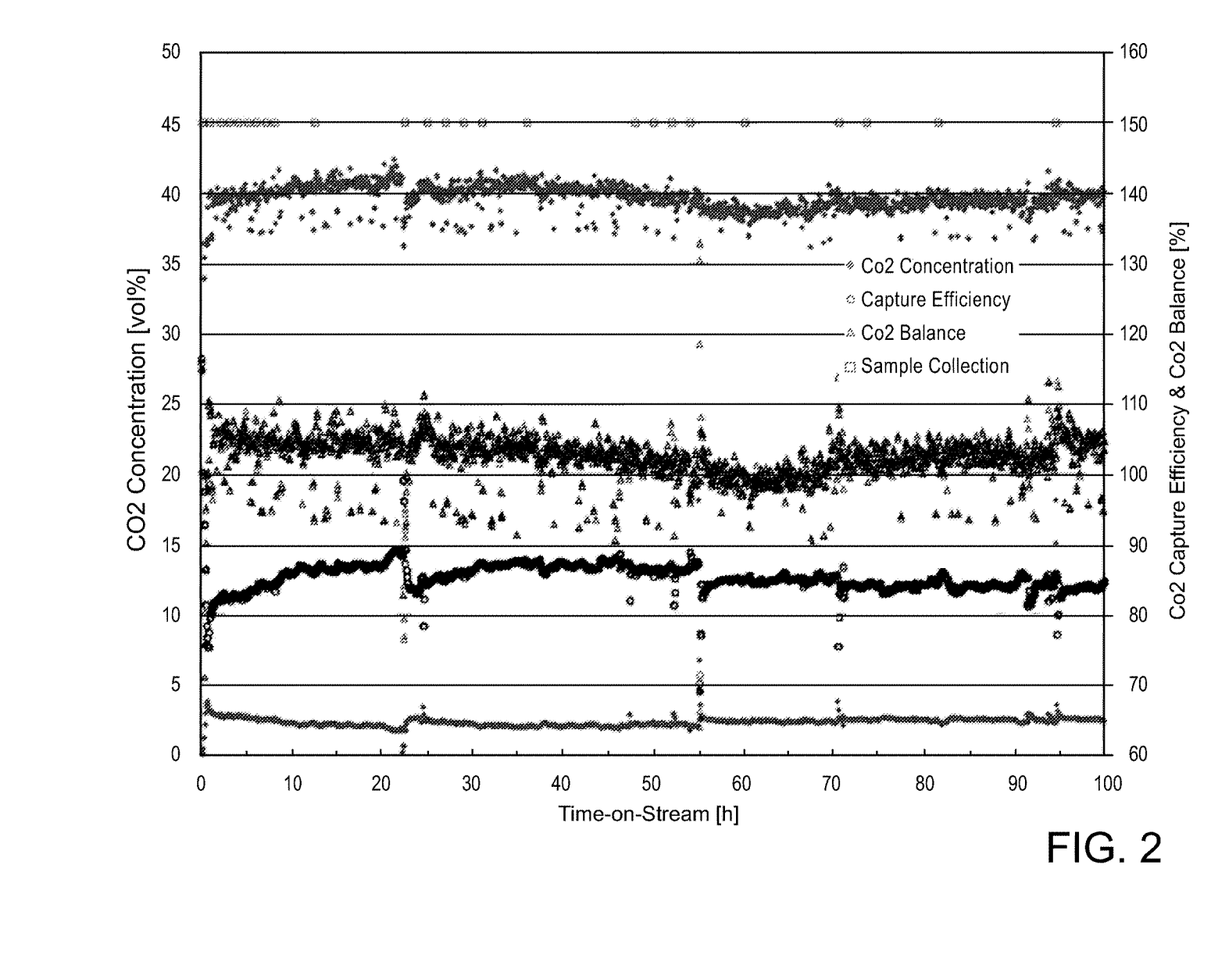
FIG. 2: Shows time-on-stream (TOS) data for experiment demonstrating control of the water balance in a NAS $CO_2$ Removal Process.
Figure 3:
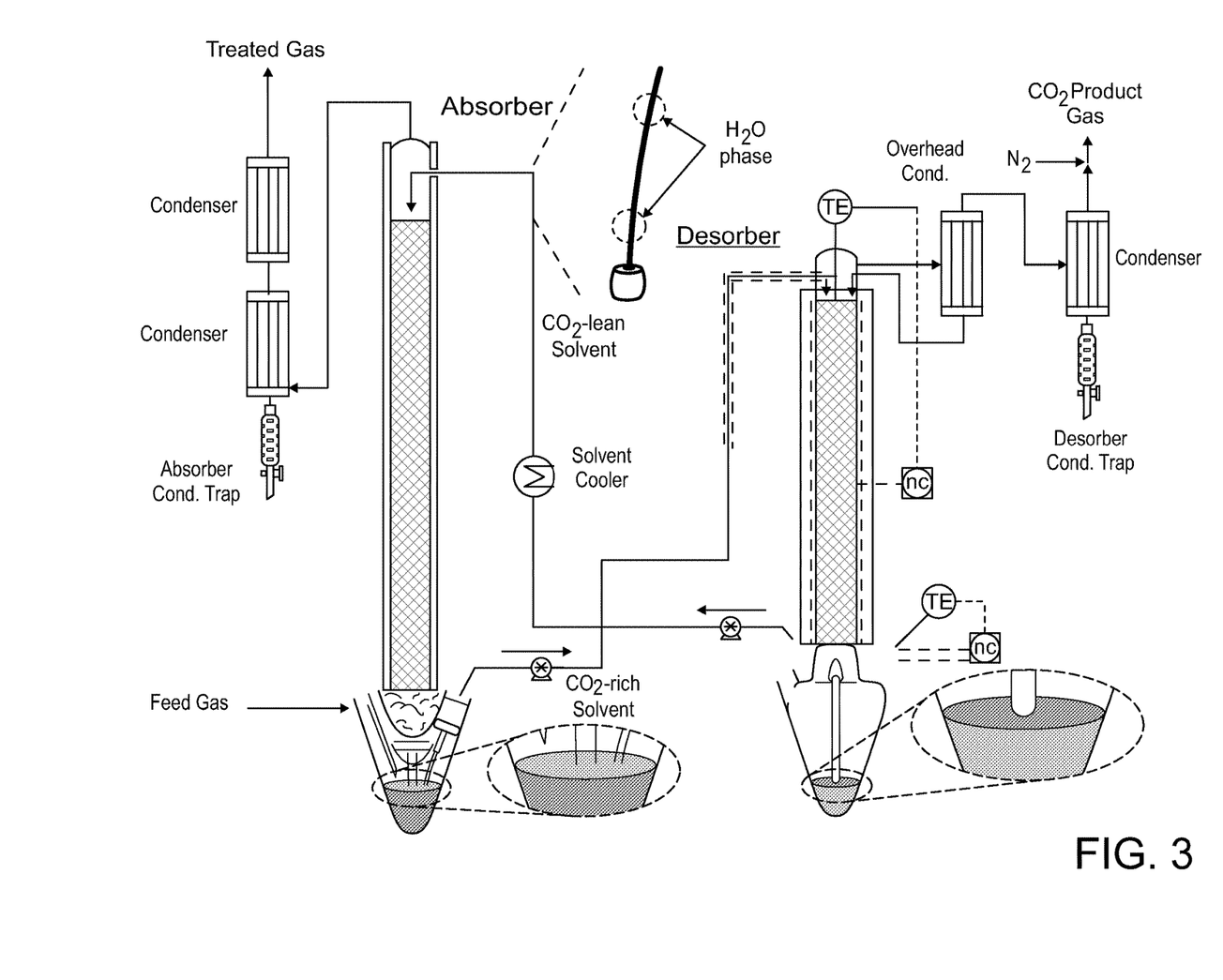
FIG. 3: Shows a simplified schematic of LsGAS after 90 h TOS showing presence of a water-rich phase in the $CO_2$-lean feed stream and no water phase in the absorber or desorber sumps.

Results presented in FIG. 2 show that the NAS $CO_2$ removal process operated in a stable manner over the entire 100 h experiment. After approximately 60 h time on stream (TOS), a second, water-rich, phase was observed in the $CO_2$-lean NAS feed to the absorber downstream of the solvent cooler as can be seen in FIG. 3. Operating the system under these specific process conditions resulted in the system having a neutral water balance over a period of 100 h with the majority of the water being introduced to the system leaving via the treated flue gas (absorber outlet). In addition, under these conditions, the system was found to operate in a manner consistent with that described in EXAMPLE 1, in which a water-NAS mixture is fed to the top of the absorber as a means of water balancing the process by humidifying (ideally saturating) the treated gas.

This experiment demonstrated that the formation of a water-rich phase can be avoided in the absorber and desorber sumps through control of the process operating conditions thus eliminating the necessity for a water-NAS separation device and the formation a water-rich stream containing trace quantities of NAS that must be mechanically separated.

Further, Example 2 teaches:
that the teachings from Example 1, which were based on equilibrium measurements, are correct and have been validated in a continuous flow process arrangement consistent with a commercial AG scrubbing/removal process that a NAS AG scrubbing process and particularly a $CO_2$ removal process can be operated such that water, which is introduced to the process in the feed gas to the absorber, can be balanced by leaving in the process in the treated gas exiting the absorber that a NAS acid-gas scrubbing process can be operated in a manner that avoids the formation of a separate, water-rich phase in the desorber that a NAS acid-gas scrubbing process can be operated such that the treated gas exiting the Absorber carries a majority of the water that enters in the feed gas to the absorber from the process that a NAS acid-gas scrubbing process can be operated such that the most likely position in the process for water separated from the NAS is downstream of the solvent cooler

5.3 Example 3

Controlling the Water Balance in a NAS $CO_2$ Removal Process (Study #1)

An experiment was performed to demonstrate that the formation of a water-rich phase can be avoided in the process through control of the operating conditions of the $CO_2$ absorber thus eliminating the necessity for a water-NAS separation device and creating a single phase NAS process. Specifically, operating the process such that water-rich stream containing trace quantities of NAS is eliminated.

Figure 1:
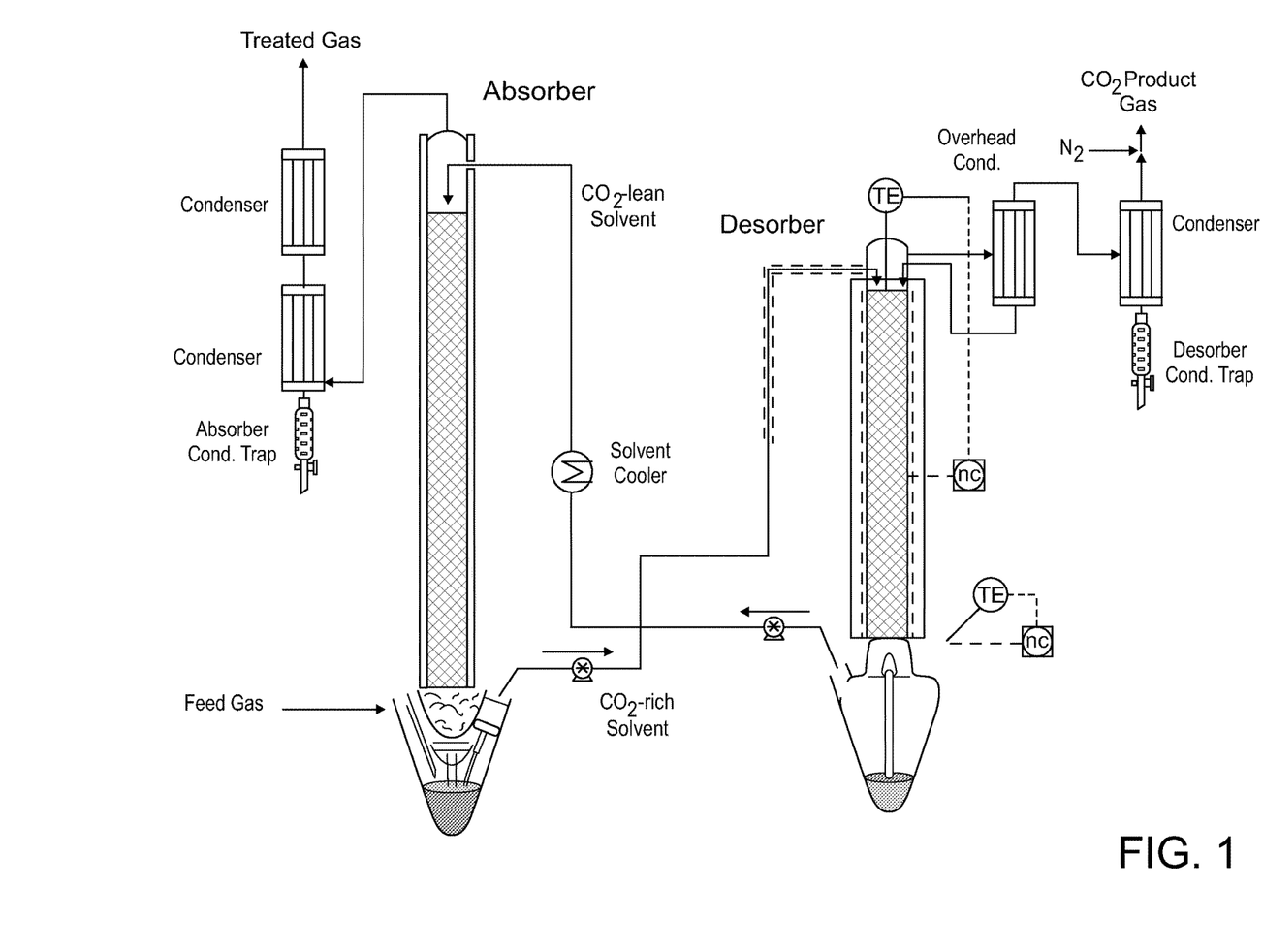
FIG. 1: Shows a simplified schematic of the lab-scale, continuous flow gas absorption system having a standard absorber-desorber configuration.

A simplified schematic of the LsGAS is provided in FIG. 1 and the operating conditions are provided in Table 3. An exemplary NAS consisting of equimolar portions of 2-fluorophenethylamine (2FPEA) and octafluoropentanol (OFP) was used in this study. For the treated gas to carry the same mass of water it must leave the absorber slightly warmer than the flue gas enters the column since both gases are approximately saturated with water and the flow rate of the treated gas is lower than the feed gas due to the removal of the $CO_2$. In this case, the feed gas entered the absorber saturated at 38° C. which corresponds to a mass flow rate of water of 9.49 $g_{H2O}$/h. In the case that the treated flue gas leaves the column at the same temperature as feed solvent, 40° C., assuming that the gas is saturated with water it will carry with it 9.27 $g_{H2O}$/h. The expected accumulation rate of 0.22 $g_{H2O}$/h is small considering the scale of the system the amount of heat loss to the environment and the fact that the treated gas will be warmer than the solvent. Therefore, it was expected that these operating conditions will lead to a neutral water balance.

Selected process measurements from this experiment are presented in

FIG. 3: Shows a simplified schematic of LsGAS after 90 h TOS showing presence of a water-rich phase in the $CO_2$-lean feed stream and no water phase in the absorber or desorber sumps.

Figure 4:
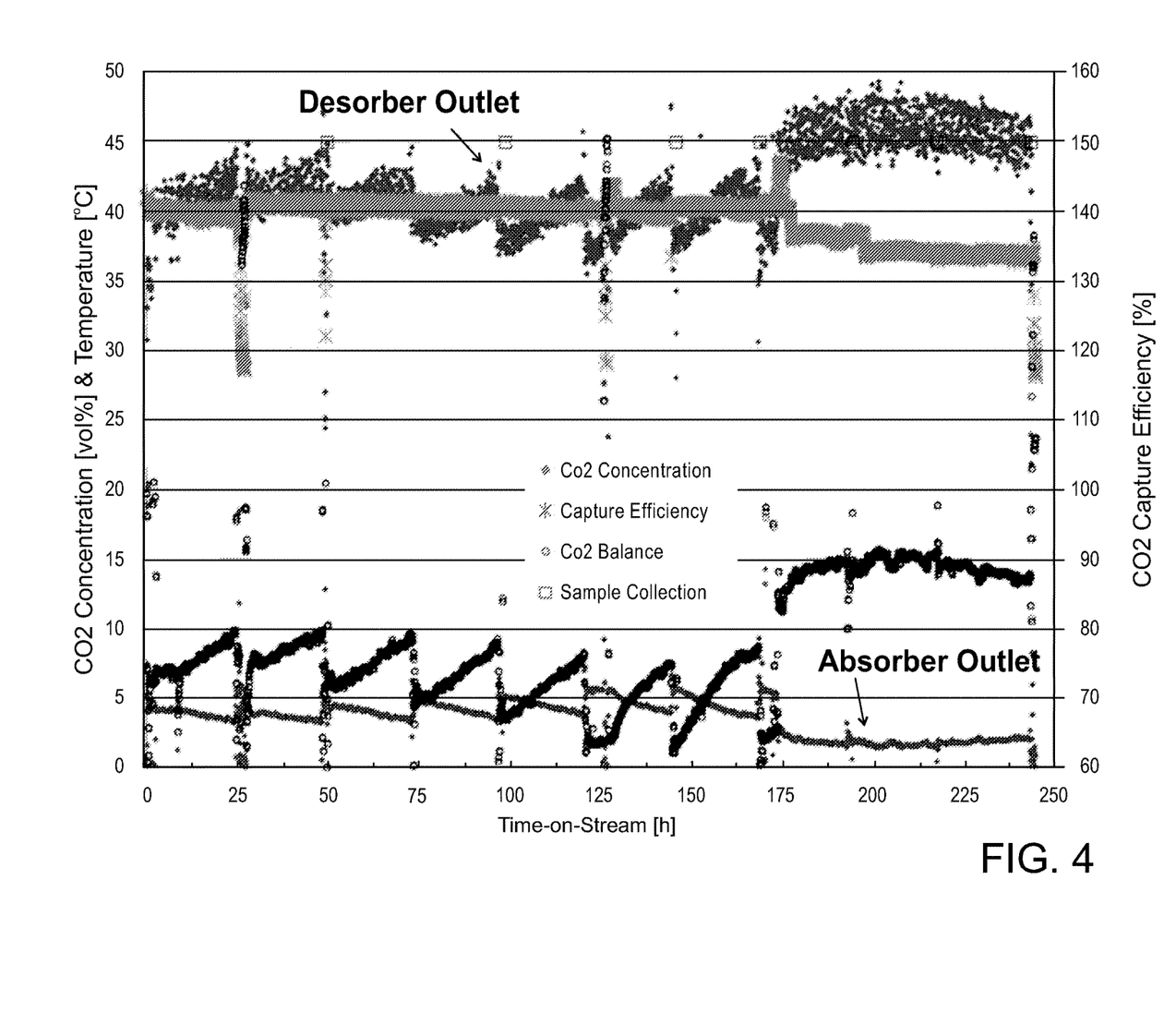
FIG. 4: Shows TOS data for experiment demonstrating that the water balance in a NAS $CO_2$ Removal Process can be controlled and operated without the formation of a separate, water-rich phase.

FIG. 4. From these results it is seen that the system was stable and operable over a 225 h period. For the first 175 h (7.5 days) the operating conditions were maintained at those described in Table 3. Under these conditions, the system was found to operate in a stable manner without the appearance of a water-rich phase in the process, however, the $CO_2$ capture efficiency was found to be dependent upon the NAS composition as exhibited by the saw-tooth shape of the $CO_2$ capture efficiency. The water content of the NAS under these conditions was found to be quite stable at ~2 wt %, which is much lower than the saturation level of ~8 wt % (based on equilibrium measurements). As such, the water content of the solvent is below its saturation level.

After 175 h TOS, the temperature of the $CO_2$-lean NAS feed was reduced to 38° C. as a means of reducing the temperature of the treated flue gas to determine if the water content of the NAS could be increased while still avoiding the formation of a water-rich phase. Reducing the feed temperature by 2° C. increased the water content in the solvent from ~2 wt % to 6-7 wt % in less than 24 hours and over the next 70 h no water-rich phase was observed. Reducing the temperature of the solvent feed immediately improved the $CO_2$ capture efficiency from ~70% to ~88% and dramatically improved the stability of the performance.

These results indicate that the water balance, water content in the NAS, and the appearance of a water-rich phase in the process can be controlled by manipulation of process conditions including the temperature profile of the absorber.

Further, Example 3 teaches:
that the water content of the NAS in a NAS AG removal process and particularly a NAS $CO_2$ removal process can be varied by control of process parameters
that the formation of a separate water-rich phase can be avoided in a NAS AG removal process and particularly a NAS $CO_2$ removal process
the water balance in a NAS AG removal process and particularly a NAS $CO_2$ removal process can be maintained by control of the process such that a majority of the water entering the process in the feed gas leaves the process in the treated gas stream

5.4 Example 4

Controlling the Water Balance in a NAS $CO_2$ Removal Process (Study #2)

This experiment was performed to demonstrate that the water balance in the NAS process can be controlled by manipulating process parameters. The goal of this work was to show that the water balance could be controlled, that the water content in the process could be controlled, and that multiple water balance conditions exist. This experiment consisted of operating the process at four different conditions described in Table 4 with all other process conditions remaining the same. An exemplary NAS consisting of equimolar portions of 2-fluorophenethylamine (2FPEA) and octafluoropentanol (OFP) was used in this study.

is below the saturation level. This experiment verified that the process could be operated and controlled in a water balanced manner.

The process operating conditions were then adjusted such that a water balance was not maintained and water would accumulate "Water Accumulating". Within 24 hours of operation under these conditions, the water content of the NAS increased to the saturation level, approximately 7.6% wt $H_2O$, and in fact exceeded the saturation level of the solvent resulting in the formation of water-rich phase in the process. This water-rich phase was visually observed in the desorber sump. The measured rate of water accumulation was found to be +0.29 g/h verifying that the water balance is positive and therefore more water is entering and accumulating within the process then exiting. This experiment verified that the process could be operated and controlled such that the water balanced could be shifted to water accumulating conditions.

The process operating conditions were then adjusted such that the water balance shifted to "Water Stripping" conditions. Under these conditions, more water leaves the process than is being introduced. Within 24 hours of operation under these conditions, the water-rich phase in the desorber sump was eliminated and the water content of the NAS decreased to below the saturation level. The measured rate of water accumulation was found to be −0.42 g/h verifying that the water balance is negative and therefore more water is leaving the process then entering. This experiment verified that the process could be operated and controlled such that the water balanced could be shifted to water stripping conditions.

The process operating conditions were then adjusted such that the water balance shifted to "Water Balanced—Condition #2" conditions. Under these conditions, the process is predicted to operate in a water balanced condition. The objective of this experiment was to demonstrate that there are numerous water balanced conditions that is that the net rate of water accumulation is zero. In this experiment, two conditions are demonstrated but more can be envisioned. Under these conditions, the measured rate of water accumulation was found to be 0.00 g/h verifying that the process is water balanced and therefore the rate of water entering the process is equal to the rate of water leaving.

Example 4 demonstrated that a NAS $CO_2$ removal process could maintain a water balance, be shifted into a water accumulation state, stripped of water, and returned to a different water balance state by adjusting the absorber gas feed (i.e., water content) and solvent feed temperatures.

TABLE 4

| | Water Balanced -Condition 1- | Water Accumulating | Water Stripping | Water Balanced -Condition 2- |
|---|---|---|---|---|
| Gas Feed Temperature [° C.] | 37.2 | 40.0 | 35.0 | 40.0 |
| Absorber Gas Outlet Temperature [° C.] | 40.0 | 40.0 | 40.0 | 42.5 |
| Expected Rate of Water Accum. [g h$^{-1}$] | 0 | 1.25 | −1.25 | 0 |

Results from this experiment are presented in Table 5. Under "Water Balanced—Condition #1" conditions, the process was found to maintain a water balance over a 24 hour period with a rate of water accumulation of approximately 0.01 g/h. Under these conditions, no separate, water-rich phase observed in the process and in fact the water content in the NAS was approximately 1.32% wt $H_2O$ which These results indicate that the water content in the NAS process can be effectively controlled and shifted as desired between water accumulating, water balanced, and water stripping conditions. In addition, these experiments show that there are numerous steady states with respect to balancing water and that the process can be operated in a manner to purposefully accumulate or strip water on an as-needed basis. It may be beneficial to accumulate water during specific operational timeframes and similarly to strip water at others.

TABLE 5

|  | Water Balanced -Condition 1- | Water Accumulating | Water Stripping | Water Balanced -Condition 2- |
| --- | --- | --- | --- | --- |
| Gas Feed Temperature [° C.] | 35.2 | 40.1 | 35.2 | 40.1 |
| Absorber Gas Outlet Temperature [° C.] | 37.8 | 40.0 | 40.0 | 42.0 |
| Absorber Solvent Feed [° C.] | 39.6 | 35.0 | 35.5 | 36.2 |
| Measured Rate of Water Accum. [g h$^{-1}$] | 0.01 | 0.29 | −0.42 | 0.00 |
| H$_2$O Content in Solvent [wt %] | 1.32 | 7.60 | 5.51 | 5.72 |
| Separate Aqueous Phase | No | Yes - Regen. Sump | No | No |
| CO$_2$ Capture Efficiency [%] | 85.22 | 87.36 | 86.03 | 86.75 |

Figure 5:
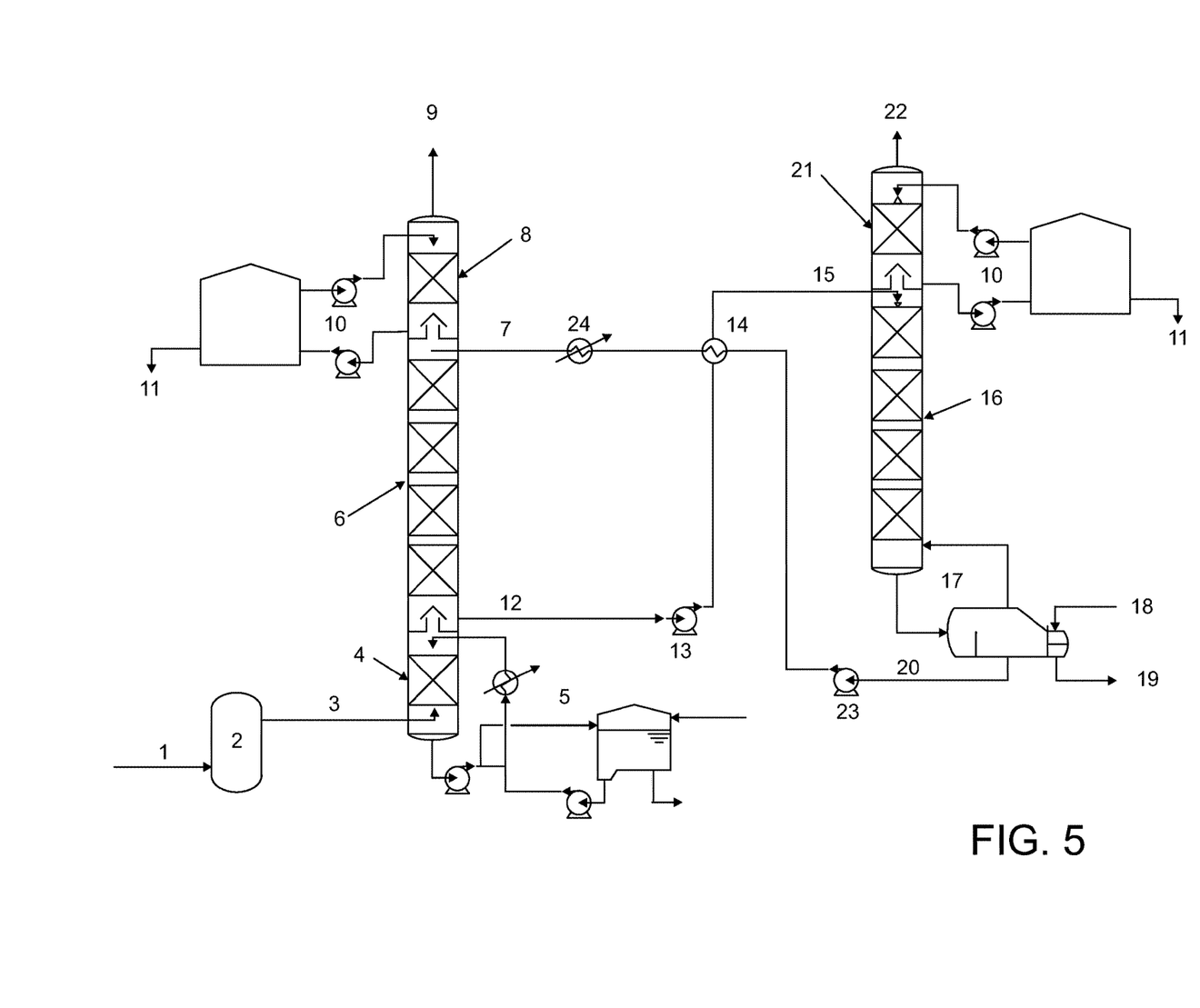
FIG. 5: Shows a schematic of the key components of one non-limiting embodiment of an acid gas scrubbing process arrangement with a water balancing system.

Further, Example teaches:
that the water content of a NAS AG scrubbing process and particularly a NAS CO$_2$ capture process can be controlled by manipulating process variables such that the process the rate of water accumulation is net zero (balanced), positive (accumulating), or negative (stripping)
that more than one set of process conditions exists to maintain a water balance in a NAS CO$_2$ removal process FIG. 5 shows one non-limiting embodiment of an acid gas recovery system. One of ordinary skill would recognize alternative configurations are possible. In particular raw flue gas (1) enters a wet flue gas desulfurization (FGD) unit (2) and the De-SOx'd flue gas (3) leaves. The FGD unit has a deep desulfurization/direct contact cooling section (4) and a deep desulfurization/direct contact cooling unit (5). The De-SOx'd flue gas (3) enters the CO2 absorber section (6) which as has a CO$_2$-lean solvent (or NAS) feed to absorber section (7) and absorber overhead wash section (8). The treated flue gas sent to stack/exhaust (9) exits from the CO$_2$ absorber section (6). Also coupled to the CO$_2$ absorber section (6) is a wash unit (10) and a flow for recovered solvent (or NAS) return to process (11).

The CO2-rich solvent (or NAS) (12) leaves from the CO2 absorber section (6) and flows to an absorber sump pump (13) and a crossover heat exchanger (14). The CO$_2$-rich solvent (or NAS) feed to solvent regenerator (15) flows into the solvent regenerator (16). coupled to the solvent regenerator (16) may be a reboiler (17) generating low-pressure steam (18) and/or condensate (19). The CO2-lean solvent (or NAS) (20) is returned to the CO$_2$ absorber section (6). The solvent regenerator (16) has an off-gas cooler and wash section (21) generating CO$_2$ product gas to a compression train (22) or other CO$_2$ product gas use and a wash unit (10) and a flow for recovered solvent (or NAS) return to process (11). The reboiler (17) is connected to a regenerator pump (23) and trim cooler (24) in fluid connection with the CO$_2$ absorber section (6).

It is to be understood that, while the invention has been described in conjunction with the detailed description, thereof, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application were specifically and individually indicated to be incorporated by reference.

What is claimed is:

1. A process for regulating water content and removing acid gases from a water-containing gas stream using a non-aqueous solvent (NAS) absorption liquid, wherein the NAS absorption liquid has a solubility of less than about 10 g of water per 100 g of NAS which comprises:
    (a) treating the gas stream in an absorption zone with the NAS absorption liquid under a first set of controlled conditions of temperature, pressure and flow rate to obtain an acid gas-depleted treated gas stream and an acid gas-loaded NAS absorption liquid;
    (b) directing the acid gas-loaded NAS absorption liquid to a regeneration zone under a second set of controlled conditions of temperature, pressure and flow rate and regenerating the loaded NAS absorption liquid to expel a portion of the acid gases and obtain a regenerated NAS absorption liquid;
    (c) directing the regenerated NAS absorption liquid to step a); and
    (d) controlling the first and second set of conditions such that the temperature for the first set of controlled conditions is greater than 30° C. and less than 57° C. so as to avoid the necessity of a separation device to separate a water-rich phase from the NAS absorption liquid, to regulate the water content, and remove acid gases from the water-rich gas stream and wherein the water content is regulated such that the quantity of water entering the process in the water-rich gas stream balances the water content leaving the process in the acid gas-depleted treated gas stream or off gases from the regeneration zone.

2. The process of claim 1, wherein the acid gas is carbon dioxide.

3. The process of claim 1, wherein the water-containing gas stream is from a desulfurization pre-treatment process.

4. The process of claim 1, wherein the gas stream is a flue gas from the combustion of a fossil fuel.

5. The process of claim 1, wherein the gas stream is an exhaust gas from a combustion process.

6. The process of claim 1, wherein the gas stream is an exhaust gas from a cement plant.

7. The process of claim 1, wherein regenerating the loaded NAS absorption liquid occurs by pressure release, heating, stripping or a combination thereof.

8. The process of claim 1, wherein the loaded NAS absorption liquid is preheated by indirect heat exchange with the regenerated absorption liquid.

9. The process of claim 1, wherein the NAS absorption liquid comprises a nitrogenous base; a weak acid having pKa between 8-15; and a hydrophobic, aliphatic diluent or a polyether diluent; or combination thereof.

10. The process of claim 1, wherein the NAS absorption liquid comprises a nitrogenous base having a nitrogen with a hydrogen atom leaving group, a weak acid, and a hydrophobic diluent.

11. The solvent system of claim 1, wherein the solvent system is immiscible with water.

12. The process of claim 9, wherein the nitrogenous base is an amine, an amidine, a guanidine, or a combination thereof.

13. The process of claim 9, wherein the weak acid is a fluorinated alcohol, a phenol, a substituted phenol, or a combination thereof.

14. The process of claim 9, wherein the nitrogenous base is 2-fluorophenylethylamine or N-methylbenzylamine; the weak acid is aniline, octafluoropentanol, phenol, substituted phenol; and the polyether diluent is a substituted ether of polyethylene glycol, a substituted ether of polypropylene glycol, or a mixture thereof.

15. The process of claim 1, wherein the temperature for the first set of controlled conditions are greater than 30° C. and less than 42.5° C.

16. The process of claim 1 wherein the temperature for the first set of controlled conditions are greater than 35° C. and less than 42.5° C.

17. A process for regulating water content and removing acid gases from a water-containing gas stream using a non-aqueous solvent (NAS) absorption liquid, wherein the NAS absorption liquid has a solubility of less than about 10 g of water per 100 g of NAS which comprises:

(a) treating the gas stream in an absorption zone with the NAS absorption liquid under a first set of controlled conditions of temperature, pressure and flow rate to obtain an acid gas-depleted treated gas stream and an acid gas-loaded NAS absorption liquid;

(b) directing the acid gas-loaded NAS absorption liquid to a regeneration zone under a second set of controlled conditions of temperature, pressure and flow rate and regenerating the loaded NAS absorption liquid to expel a portion of the acid gases and obtain a regenerated NAS absorption liquid;

(c) directing the regenerated NAS absorption liquid to step a); and (d) controlling the first and second set of conditions such that the temperature for the first set of controlled conditions is greater than 30° C. and less than 57° C. so as to (i) balance the water content entering the process in the water-rich gas stream with the water content leaving the process and (e) remove acid gases from the water-rich gas stream.

* * * * *